United States Patent
Ramos et al.

(10) Patent No.: US 10,686,611 B2
(45) Date of Patent: Jun. 16, 2020

(54) DATA ANONYMIZING BLOCKCHAIN SYSTEM

(71) Applicant: International Business Machines Corporation, Armonk, NY (US)

(72) Inventors: Igor Ramos, Georgetown, TX (US); Ana Biazetti, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 15/822,010

(22) Filed: Nov. 24, 2017

(65) Prior Publication Data

US 2019/0165949 A1  May 30, 2019

(51) Int. Cl.
| | |
|---|---|
| *H04L 9/32* | (2006.01) |
| *G06Q 50/26* | (2012.01) |
| *G06F 21/62* | (2013.01) |
| *H04L 9/14* | (2006.01) |
| *H04L 9/06* | (2006.01) |
| *H04L 29/08* | (2006.01) |

(52) U.S. Cl.
CPC ........ *H04L 9/3263* (2013.01); *G06F 21/6254* (2013.01); *G06Q 50/265* (2013.01); *H04L 9/0637* (2013.01); *H04L 9/14* (2013.01); *H04L 9/3239* (2013.01); *H04L 9/3247* (2013.01); *H04L 67/1097* (2013.01); *H04L 2209/38* (2013.01); *H04L 2209/42* (2013.01); *H04L 2209/805* (2013.01)

(58) Field of Classification Search
CPC .... G06Q 20/0655; G06Q 20/40; G06F 21/45; H04L 67/1097; H04L 67/02

USPC ......................................................... 713/156
See application file for complete search history.

(56) References Cited

U.S. PATENT DOCUMENTS

| | | | |
|---|---|---|---|
| 7,746,378 B2 | 6/2010 | Shu et al. | |
| 9,397,985 B1* | 7/2016 | Seger, II | ............. H04L 63/0442 |
| 2013/0004090 A1* | 1/2013 | Kundu | .................. G07F 19/207 |
| | | | 382/232 |
| 2016/0335497 A1* | 11/2016 | Williams | ........... G06K 9/00671 |
| 2017/0046664 A1* | 2/2017 | Haldenby | .......... G06Q 20/0655 |
| 2017/0048216 A1 | 2/2017 | Chow et al. | |
| 2017/0140375 A1* | 5/2017 | Kunstel | .................. G06Q 20/40 |
| 2017/0140408 A1 | 5/2017 | Wuehler | |
| 2017/0206523 A1* | 7/2017 | Goeringer | ............... G06F 21/45 |
| 2017/0206532 A1* | 7/2017 | Choi | ....................... H04L 67/02 |
| 2018/0117446 A1* | 5/2018 | Tran | ..................... A61B 5/0022 |
| 2018/0139056 A1 | 5/2018 | Imai et al. | |

(Continued)

FOREIGN PATENT DOCUMENTS

GB  201413284  9/2014

Primary Examiner — Bryan F Wright

(57) ABSTRACT

An example operation may include one or more of storing encrypted IoT data as transactions in a blockchain, the IoT data being captured by one or more edge devices of an IoT network, receiving an identification of an event, and in response, retrieving encrypted IoT transaction data stored in the blockchain which is associated with the event, decrypting, via a blockchain node, the retrieved IoT transaction data associated with the event and generating anonymized data of the event from the decrypted IoT transaction data in which personally identifiable information is anonymized, and outputting information concerning the anonymized data of the event to one or more of a user device and a display device.

20 Claims, 8 Drawing Sheets

(56) References Cited

U.S. PATENT DOCUMENTS

2018/0285767 A1* 10/2018 Chew ................. H04L 67/1097
2019/0166101 A1    5/2019 Ramos et al.

* cited by examiner

400B

| Signed Key | Device ID | Data | Time | Location |
|---|---|---|---|---|
| X12345 | xxxx-xxxx | 3 Images | Aug 31 (2:23pm) | 39.09/-94.57 |
| Y23456 | xxxx-xxxx | Video | Aug 31 (2:21pm) | 39.10/-94.56 |
| Z34567 | xxxx-xxxx | 11 Images | Aug 31 (2:27pm) | 39.08/-94.58 |
| A09876 | xxxx-xxxx | 7 Images | Aug 31 (2:29pm) | 39.06/-94.61 |
| B87654 | xxxx-xxxx | Video | Aug 31 (2:33pm) | 39.04/-94.66 |

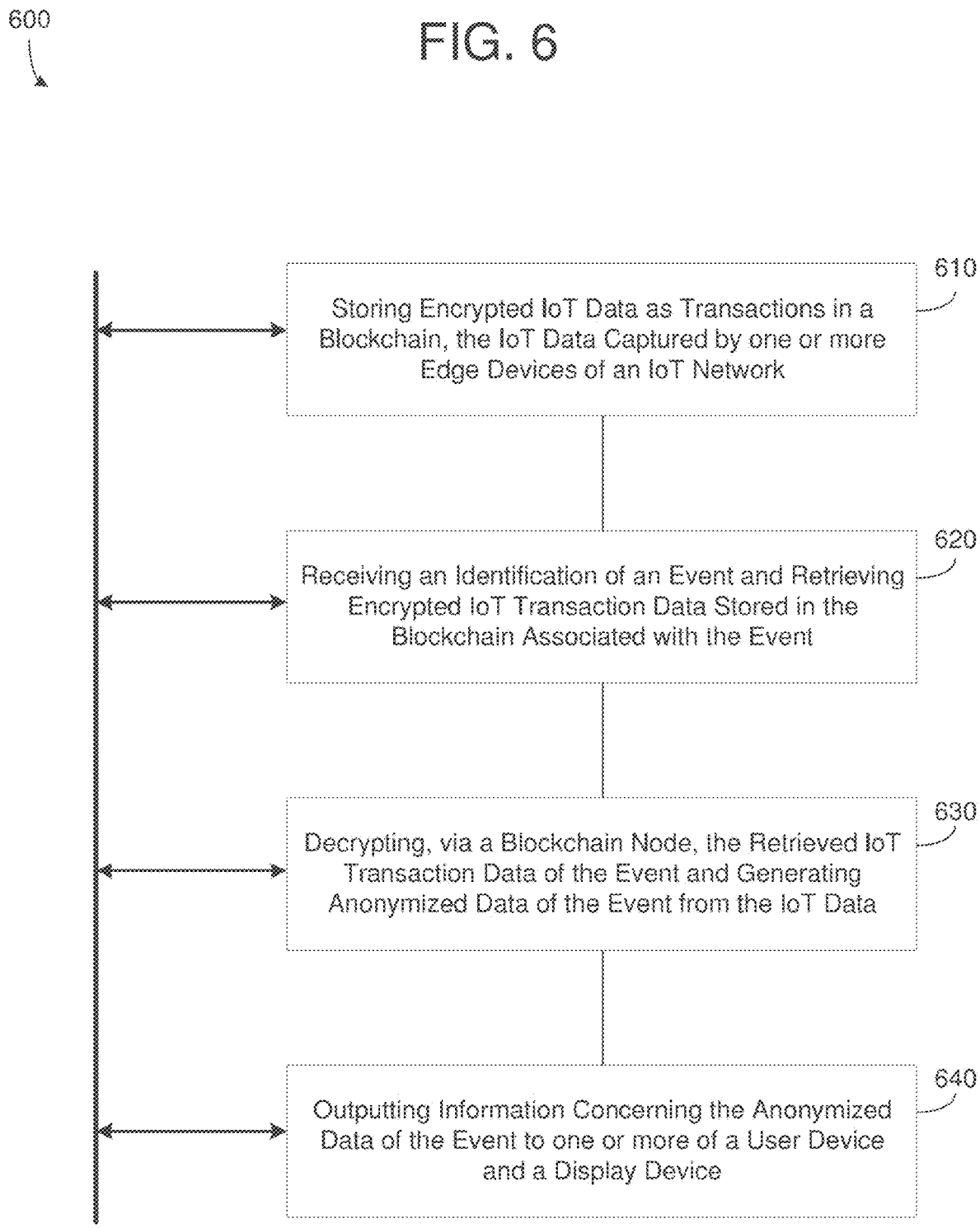

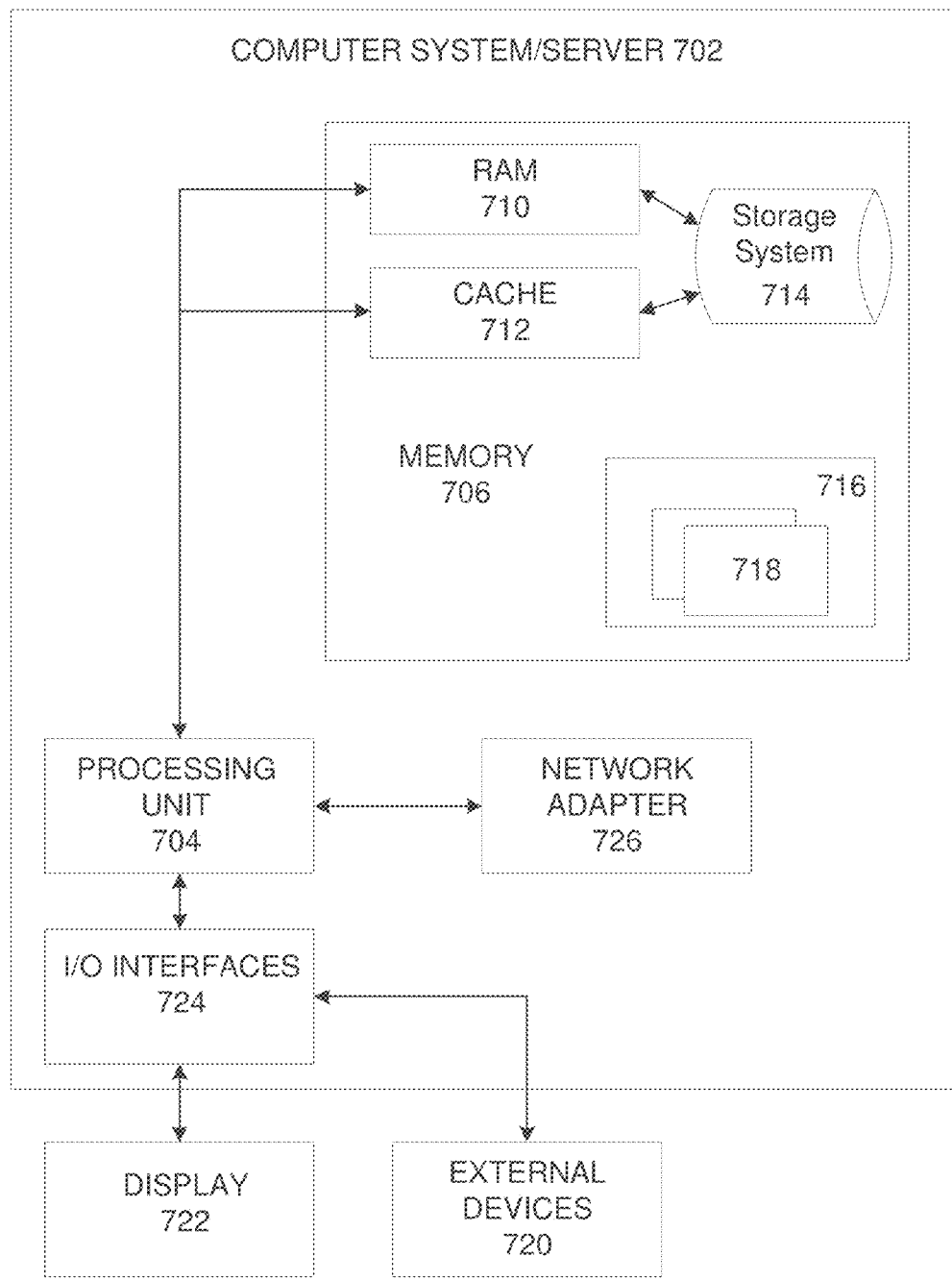

DATA ANONYMIZING BLOCKCHAIN SYSTEM

TECHNICAL FIELD

This application generally relates to blockchain transactions, and more particularly, to a data anonymizing blockchain system.

BACKGROUND

Crime and other events that threaten public safety have long been an issue on society. Meanwhile, personal privacy is important to protect to the extent that it allows individuals to control how and what information about them is communicated to others. As a result, there is a struggle to achieve a balance between public safety and personal privacy. Authorities and corporations have begun using cameras positioned in public areas to help with public safety. For example, cameras can be installed on street lights, outside buildings, structures, roads, on vehicles, and the like. However, the capture of personal information in public environments can be construed as an invasion of privacy. Accordingly, there is a need to ensure that personal data acquired about a user within a public setting is protected against improper access and use.

A blockchain may be used as a public ledger to store transaction information involving digital assets and the like. Because any individual or entity can often provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

SUMMARY

In one example embodiment, provided is a method that includes one or more of receiving edge data that has been captured by one or more edge devices in an Internet of Things (IoT) network, encrypting the received edge data and storing the encrypted edge data as one or more transactions within a blockchain, determining, by a blockchain node, that an event has been captured by the received edge data based on metadata of the received edge data, and in response to determining that the event has been captured, generating a notification associated with the event being captured and outputting the generated notification for display on a user device.

In another example embodiment, provided is a computing system that includes one or more of a network interface configured to receive edge data that has been captured by one or more edge devices in an Internet of Things (IoT) network, and a processor configured to encrypt the received edge data, store the encrypted edge data as one or more transactions within a blockchain, and determine that an event has been captured by the received edge data based on metadata of the received edge data. In this example, in response to determining that the event has been captured, the processor may be further configured to generate a notification associated with the event being captured, and control the network interface to output the generated notification for display on a user device.

In another example embodiment, provided is a non-transitory computer readable medium having stored therein program instructions that when executed cause a computer to perform one or more of receiving edge data that has been captured by one or more edge devices in an Internet of Things (IoT) network, encrypting the received edge data and storing the encrypted edge data as one or more transactions within a blockchain, determining, by a blockchain node, that an event has been captured by the received edge data based on metadata of the received edge data, and in response to determining that the event has been captured, generating a notification associated with the event being captured and outputting the generated notification for display on a user device.

In another example embodiment, provided is a method that includes one or more of storing encrypted Internet of Things (IoT) data as transactions in a blockchain, the IoT data being captured by one or more edge devices of an IoT network, receiving an identification of an event, and in response, retrieving encrypted IoT transaction data stored in the blockchain which is associated with the event, decrypting, via a blockchain node, the retrieved IoT transaction data associated with the event and generating anonymized data of the event from the decrypted IoT transaction data in which personally identifiable information is anonymized, and outputting information concerning the anonymized data of the event to one or more of a user device and a display device.

In another example embodiment, provided is a computing system that includes one or more of a storage configured to store encrypted Internet of Things (IoT) data as transactions in a blockchain, the IoT data being captured by one or more edge devices of an IoT network, and a processor configured to receive an identification of an event, and in response, retrieve encrypted IoT transaction data stored in the blockchain which is associated with the event, decrypt the retrieved IoT transaction data associated with the event, and generate anonymized data of the event from the decrypted IoT transaction data in which personally identifiable information is anonymized. In this example, the processor may be further configured to output information concerning the anonymized data of the event to one or more of a user device and a display device.

In another example embodiment, provided is a non-transitory computer readable medium having stored therein program instructions that when executed cause a computer to perform one or more of storing encrypted Internet of Things (IoT) data as transactions in a blockchain, the IoT data being captured by one or more edge devices of an IoT network, receiving an identification of an event, and in response, retrieving encrypted IoT transaction data stored in the blockchain which is associated with the event, decrypting, via a blockchain node, the retrieved IoT transaction data associated with the event and generating anonymized data of the event from the decrypted IoT transaction data in which personally identifiable information is anonymized, and outputting information concerning the anonymized data of the event to one or more of a user device and a display device.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 6 is a diagram illustrating a method of a blockchain anonymizing edge data in accordance with an example embodiment.

FIG. 7 is a diagram illustrating a blockchain computing system in accordance with an example embodiment.

DETAILED DESCRIPTION

Figure 1:
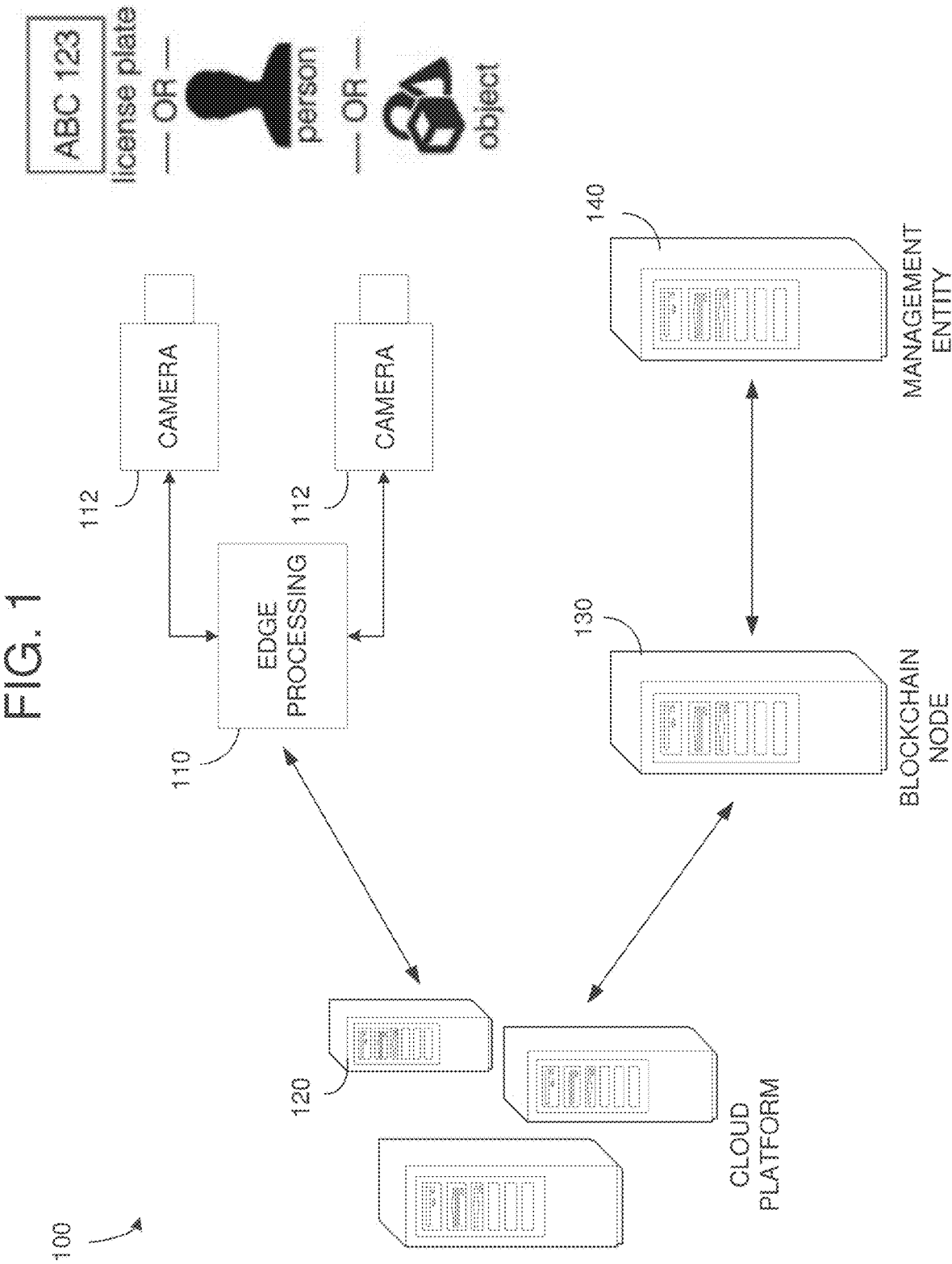
FIG. 1 is a diagram illustrating a cognitive blockchain system implemented within an IoT network in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment relates to a cognitive blockchain system which is implemented within an Internet of Things (IoT) network. In some embodiments, the blockchain system maintains or otherwise protects personal privacy of its users that provide data and that are included within the data while allowing for specific data captured by an edge device to be externalized and viewed when it satisfies specific characteristics defined by a blockchain smart contract. Data such as images, temperature measurements, particle and emission outputs, and the like, may be captured by edge devices such as traffic light cameras, user devices (crowdsourcing), sensors, dashboard cameras, and the like, and transmitted to a blockchain node of the cognitive blockchain system. The data may capture an event that has occurred such as a person or an object (e.g., a vehicle, automobile, etc.) committing a violation or a crime, involved in an accident, and the like. Within a smart contract of the blockchain may exist cognitive capabilities that can detect when an event has occurred, and what details to output to an authority when the event occurs.

According to various embodiments, the edge data may be anonymized by the blockchain system. However, the blockchain may assign a unique transaction key to each respective edge device to be used by the edge device to sign captured data sent to the blockchain thereby enabling the blockchain to verify the information is received from a trusted source. Accordingly, the blockchain may maintain a record of where and who provided the data based on the unique transaction key signature, while also shielding the user/device that captured the data. In addition, the blockchain may remove or otherwise anonymize details from the data captured (e.g., removing image data) that is not relevant to a particular event such as a crime thereby removing information about innocent bystanders. For example, the anonymization process may extract specific details (e.g., a license plate, a face, a vehicle, a victim, etc.) of an event while preventing other details from being revealed thereby maintain privacy of individuals out in public environments as well as maintaining a privacy of the user or the entity that captured the edge data.

The smart contract executing on the blockchain node can encrypt the data received from the edge devices and store the data in the cognitive blockchain. Here, the ability to decrypt the encrypted edge data may be maintained within the blockchain itself (i.e., a smart contract on a blockchain node) thereby protecting the data from being accessed publicly or by anyone other than the blockchain. Furthermore, the smart contract may also perform cognitive analysis on the received data prior to the data being encrypted and stored in the blockchain. For example, the smart contract may cognitively identify situations or other events that have occurred in which the encrypted (i.e., protected) data should be made available to specifically authorized parties such as corporations, authorities, and the like. The smart contract can analyze the received data as well as metadata associated with the received data and determine a level of confidence that an event has occurred based on the data. When the confidence has reached a predetermined threshold, the smart contract may be satisfied that the event has occurred and output a notification concerning the event to an authority device/system.

For example, a single edge device capturing data of a possible violation may be a false positive and may not be enough to warrant an event determination by the cognitive blockchain. However, more than one edge device capturing the same violation (e.g., two or more) may improve the confidence of the smart contract determination. Furthermore, metadata associated with images/data captured by the edge devices may be used to improve the confidence of the event detection. For example, the metadata of the captured data may include a geographical location at which the data was captured, a time when the data was captured, a level of trust associated with the device that captured the data (e.g., private citizen vs. authority), an amount of devices, a type of event detected, a severity of the event, an urgency of the event, and the like, which may be used to further determine the level of confidence. When the confidence reaches or exceeds a predetermined threshold, the cognitive smart contract may make a positive determination that the event has occurred and output information about the event to an authority.

The smart contract enables publicly gathered data such as images, sensor data, and the like, captured via traffic lights, crowdsourcing, building cameras, radar, and the like, to be stored in a protected way without publishing keys for decrypting the encrypted data (other than within the blockchain system itself). Furthermore, the images/data are only made available when a cognitive analysis by the blockchain determines that a predetermined situation or event has occurred. The event may be a situation that affects public safety, for example, a crime being committed, a weather related event, an accident, a supply chain output tracking, insurance watch lists, auto insurance data, and the like. Accordingly, personal privacy may be maintained except in situations where public safety outweighs personal privacy as in the commission of a crime or other violation. That is, the blockchain herein is used to provide overall security and access control to information by allowing securely stored images and other data to remain protected unless the blockchain cognitively determines that access (e.g., limited access) should be granted to specified parties as a result of a violation of law or other event. The access to the protected information may be provided by notifications to authorized parties or by receiving dynamic queries from authorized parties about specific situations and events. For example, an authority or corporation may be provided a picture of a person, vehicle, a license plate, etc., when the smart contract determines that the person was involved in a hit-and-run accident.

In some embodiments, the received data may include images captured of a person committing a violation of law, and the determining the confidence that the event has occurred may include determining a confidence that the person committed the violation of law based on the captured images. In this example, the determining the confidence that the person committed the violation of law can be determined based on an amount of edge devices from which the information about the person was captured and a level of trust associated with the edge devices. Furthermore, the outputting may include decrypting images of the person committing the violation of law, and outputting the decrypted images of the person to an authority device or other authorized party.

FIG. 1 illustrates a cognitive blockchain system 100 implemented within an IoT network in accordance with an example embodiment. Referring to FIG. 1, the system 100 includes an object such as a person, a license plate, a vehicle, a property item, or the like, which can be detected by one or more cameras 112 in association with an event. In this example, the cameras 112 may be user devices such as mobile phones, imaging devices, and the like, performing crowdsourcing functions. As another example, the cameras 112 may be traffic lights, satellite, public safety inspection, or the like, which are disposed in a general area and capable of capturing data of people and objects in a public environment such as a street, a building, a parking lot, a park, a business, and the like. The cameras 112 in this example correspond to edge devices within an IoT network which also includes a cloud platform 120 which is capable of receiving data from various external and edge sources throughout a distributed area. Prior to the image data being transmitted to the cloud platform 120, the image data may be processed via an edge processing system 110.

In addition, the system 100 also includes a blockchain system that is implemented therein and includes a blockchain node 130. It should also be appreciated that the system may include multiple blockchain nodes however for convenience only a single blockchain node 130 is shown. The blockchain node 130 may store a blockchain as described herein which can store encrypted data captured of people, objects, and places. The blockchain node 130 may encrypt image data as well as other data received from edge devices such as noise information, pollution information, emission information, temperature information, and the like, encrypt the received data, and store the encrypted data within an IoT blockchain.

In this example, IoT may be used as an overall architecture of the system 100 for acquiring information using smart devices/cameras 112, ingesting the acquired information into the cloud platform 120 using IoT protocol, further processing the data and distributing the results via blockchain node 130 to interested parties such as management device 140 which may correspond to a corporation, a government party, an authority, and the like. According to various aspects, the blockchain node 130 includes cognitive capabilities capable of identifying and confirming that events (e.g., crimes, infractions, accidents, etc.) have been detected by edge devices. Blockchains are distributed databases with built-in pre-agreed technical and/or business logic criteria which is referred to as a smart contract. The blockchain stored by the blockchain node 130 may be synchronized with a replica of the blockchain stored by other blockchain nodes (not shown) through consensus and replication processes. Furthermore, each blockchain node 130 may include a smart contract as described herein which has cognitive capabilities.

Referring to FIG. 1, in an example, data including images may be captured by edge devices 112 which include cameras in this example, but may also include sensors, crowdsourcing, video capturing, thermal capturing devices, and the like. The collected data may be analyzed by the edge processing system 110 to create metadata associated with the collected data. The metadata may include a geographical location at which the images/data were captured, a time at which the image was captured, a device identify or controller of the device that captured the image/data, and the like. The data and/or the metadata may be stored in the cloud platform 120 and entered into a blockchain network via blockchain node 130. In some examples, however, the data may be transmitted directly from the edge devices 112 and/or the edge processor 110 to the blockchain node 130 without being stored in the cloud platform 120.

A smart contract executing on the blockchain node 130 may encrypt the received data and store the encrypted data within a blockchain. The encrypted data may remain private unless decrypted by the smart contract. That is, a key for decrypting the encrypted data may remain unavailable to anyone other than the smart contract. In one example, the smart contract encrypts the image and metadata data and determines whether to make the data or derived data accessible based on conditional logic of the smart contract. Here, exposing 'derived data' may be performed in order to hide or otherwise anonymize an identity of a witnesses (device/ user who captured the data), and only expose data pertinent to the offender. The data or data key & hash may be stored in the blockchain by the smart contract regardless of whether it is made available. In this case, because the data is encrypted, it does not really matter where data resides, if in Blockchain or an external traditional object store. However, a key for decryption may only be stored in the blockchain (i.e., blockchain peer 130), with a hash to identify location of encrypted data.

The smart contract may cognitively determine or verify that an event has been detected by the edge devices 112 and trigger notification to authorized parties such as law enforcement 140. The smart contract may determine a confidence level or amount that the event has occurred based on various attributes of the received data and metadata associated with the received data. When the confidence reaches a predetermined threshold, the smart contract may trigger the notification to the management entity device 140. For example, access to information and reports may be provided directly through notification to the management entity device 140. As another example, the management entity device 140 may query the smart contract at any time for specific data about the event and the smart contract can decrypt and provide such data when authorized to do so by the smart contract. In some embodiments, the smart contract may be the sole entity that can decrypt and analyze the stored data within the blockchain. Upon analysis triggering, the smart contract may output a blockchain transaction into the management entity ledger stored on management entity device 140. Management entity device 140 may enable notification or poll their ledger for a list of generated analysis. For example, management entity device 140 may use an event hub connection to listen for new analysis available events.

The smart contract may perform various cognitive functions. For example, the smart contract may include one or more of a method to manage device identity while anonymizing source of data, a method to weight the quality of reported data using supporting data, a method to average the contribution of several devices (e.g., crowd data over individual data, etc.), a method to protect captured data from access outside of the blockchain, a method to generate derived data (anonymous) when conditions trigger, and the like. The smart contract may also perform various additional functions which notify or otherwise provoke action by a third party such as an authority or corporation.

IoT edge devices 112 may be used to capture images and video, in some examples. To reduce data transfer sizes to the IoT Platform 120 (or other cloud platform), image preprocessing may be performed at the edge device 112 or the edge processor 110. Image processing may be used to build metadata of image including GPS location, optical character recognition (e.g., to acquire license plates numbers in the traffic monitoring scenario), geographical location, device signature, and the like. Additional server-side processing may be used for more complex algorithms, which require a larger corpus or processing power. Example of such include object detection and facial identification. Object detection for example could be used to tag a vehicle make, model year and color in captured images. Device to Cloud data transfer can be real-time data streaming or batched every few minutes, daily, or whenever desired. Another possible implementation is the storage of raw data for post processing.

It should also be appreciated that additional data besides images and video may be processed throughout the system 100. For example, data may be used to support an analysis objective. As an example, if a goal is to detect speeding drivers, edge devices may be equipped with a velocity radar and reporting readings alongside with images. Other data examples include temperature sensor, particle detectors and emissions sensor, etc. depending on the target objective. For example, a vehicle may include a pollutant sensor (mounted in the front bumper) to feed data into the blockchain smart contract. The blockchain smart contract may trigger reports of vehicles failing emissions, or areas in town where pollution exceed safe levels, may be due to an undetected plant or city infrastructure malfunction.

As another example, additional data may be used to support trustfulness in a data acquirer. If more information is provided with an image, the cognitive smart contract can have more confidence the provided data is real and not forged. For example, if it can be determined a photo was taken along the route a car takes every day, the smart contract has supporting data that increases the confidence the photo is legitimate. With that in mind, examples of data that could corroborate main data in 'analysis objective' include GPS data for a reporting device, environmental sensors data (temperature, pressure, luminosity, ultra-violet) and the like, which can be used by a cognitive system to increase confidence in data. For example, a witness device which corresponds to an edge device that sends a photo showing the presence of an offender may get a weight of 30% assigned by the cognitive analysis by the smart contract on the blockchain node 130. However, if that photo is accompanied by route information showing that the witness device was on the same road route every day, the smart contract may increase confidence that the photo is legit and the event occurred, and assign a weight of 80% to that photo.

In some embodiments, a single edge device 112 providing information may not have enough trust to trigger alerts. The cognitive smart contract can increase triggering confidence as the number of edge devices capturing the event (e.g., crowd size) increases hence reducing false positives. False positives can be due to devices turned rogue, hacked or misused or error in image processing. As a non-limiting example, if two device report an infraction, the smart contract may assign a weight of 5% confidence that the infraction occurred. As another example, if five devices report information corroborating the same infraction, then confidence or certainty could be 60%, but if ten devices report pertinent information to an infraction the confidence may be 100%.

In addition to the cognitive analysis that is performed when data enters the blockchain. The cognitive smart contract can perform retroactive analysis in acquired data, given the contract is created with such permissions. For example, person A may be missing. An authority or corporation could feed a photo of missing person to the smart contract, along with data to help reduce the data set, such as last seen date, location, etc. The smart contract may analyze captured images in search of missing person. This allows the authority to utilize the captured data, without having the possession of the photos under analysis. Instead, the authority/corporation only gets to see the data stored if there's a search match.

Figure 2:
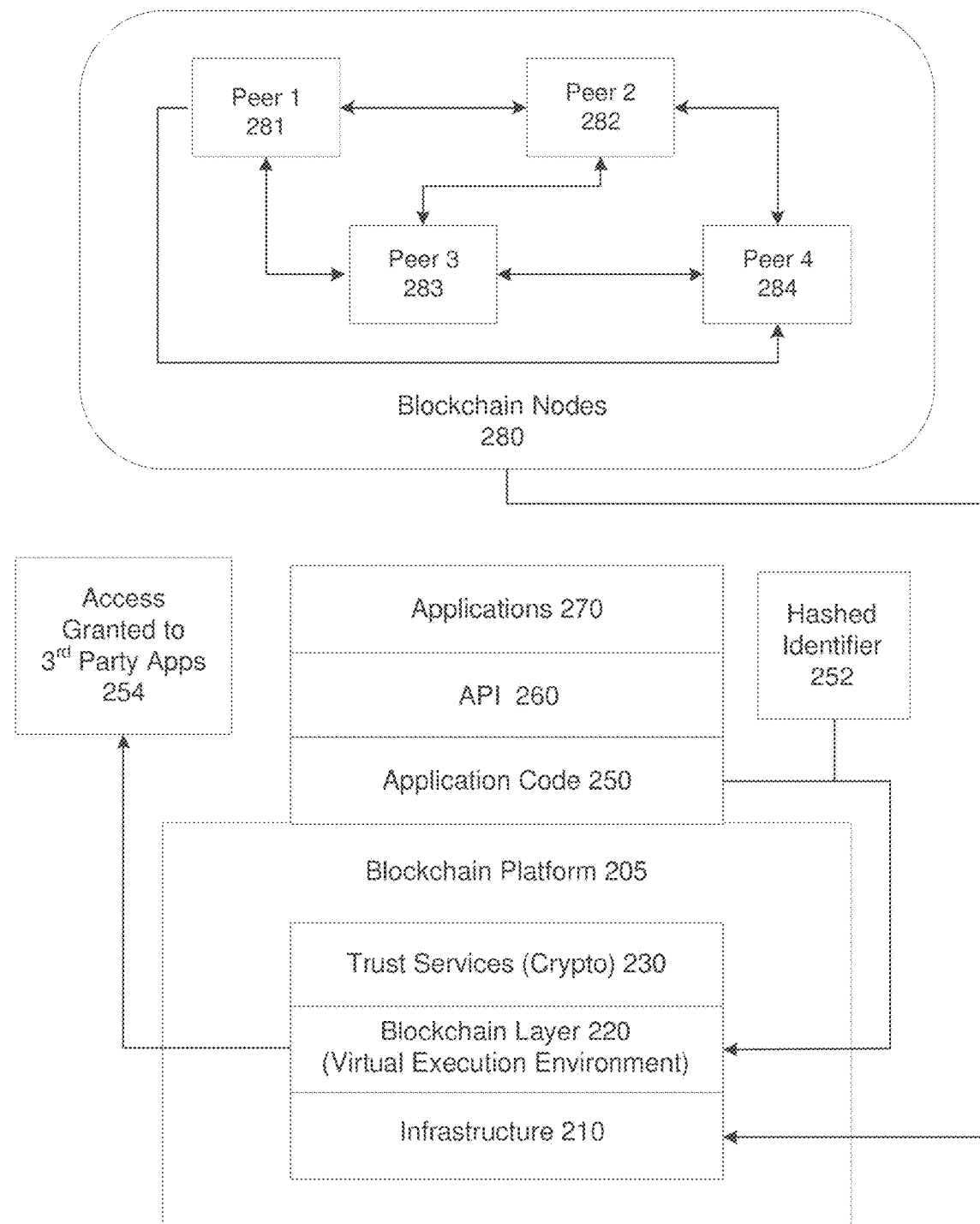
FIG. 2 is a diagram illustrating a blockchain system configuration in accordance with an example embodiment.

FIG. 2 illustrates a blockchain system database configuration, according to example embodiments. Referring to FIG. 2, blockchain system 200 may include certain common blockchain elements, for example, a group 280 of assigned peer blockchain nodes 281-284 which participate in blockchain transaction addition and validation process (consensus). As an example, the blockchain node 130 shown in FIG. 1 may be one of the peer blockchain nodes 281-284, etc. Any of the blockchain peer nodes 280 may initiate a blockchain authentication and seek to write to a blockchain immutable ledger stored in blockchain layer 220, a copy of which may also be stored on the underpinning physical infrastructure 210. In this configuration, the customized blockchain configuration may include one or applications 270 which are linked to application programming interfaces (APIs) 260 to access and execute stored program/application code (e.g., chain code and/or smart contracts) 250, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 205 may include various layers of blockchain data, services (e.g., cryptographic trust services, virtual execution environment), and underpinning physical computer infrastructure necessary to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain configuration of FIG. 2 may process and execute program/application code 250 by way of one or more interfaces exposed, and services provided, by blockchain platform 205. The code may control blockchain assets. For example, the code can store and transfer data, and may be executed by the blockchain in the form of a smart contract and associated chain code with conditions or other code elements subject to its execution. The smart contracts 250 may be created to execute reminders, updates, and/or other notifications subject to the changes, updates, etc. The smart contracts can themselves be used to identify rules associated with authorization and access requirements and usage. For example, hashed identifier information 252 received from a user device may be processed by one or more processing entities (virtual machines) included in the blockchain layer 220. The result may include access being granted 254 to a third party application from the blockchain computing environment (VM). In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a blockchain node performing a cognitive determination based on data received from one or more edge devices in an IoT network. The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. The chaincode of the smart contract described herein is configured with cognitive capabilities. The smart contract can maintain publicly acquired data (e.g., images, sensor data, communications, etc.) in a protected state and determine situations that satisfy specific criteria in which the protected data should be made accessible on a limited basis to specific parties such as an authority or a corporation.

Figure 3:
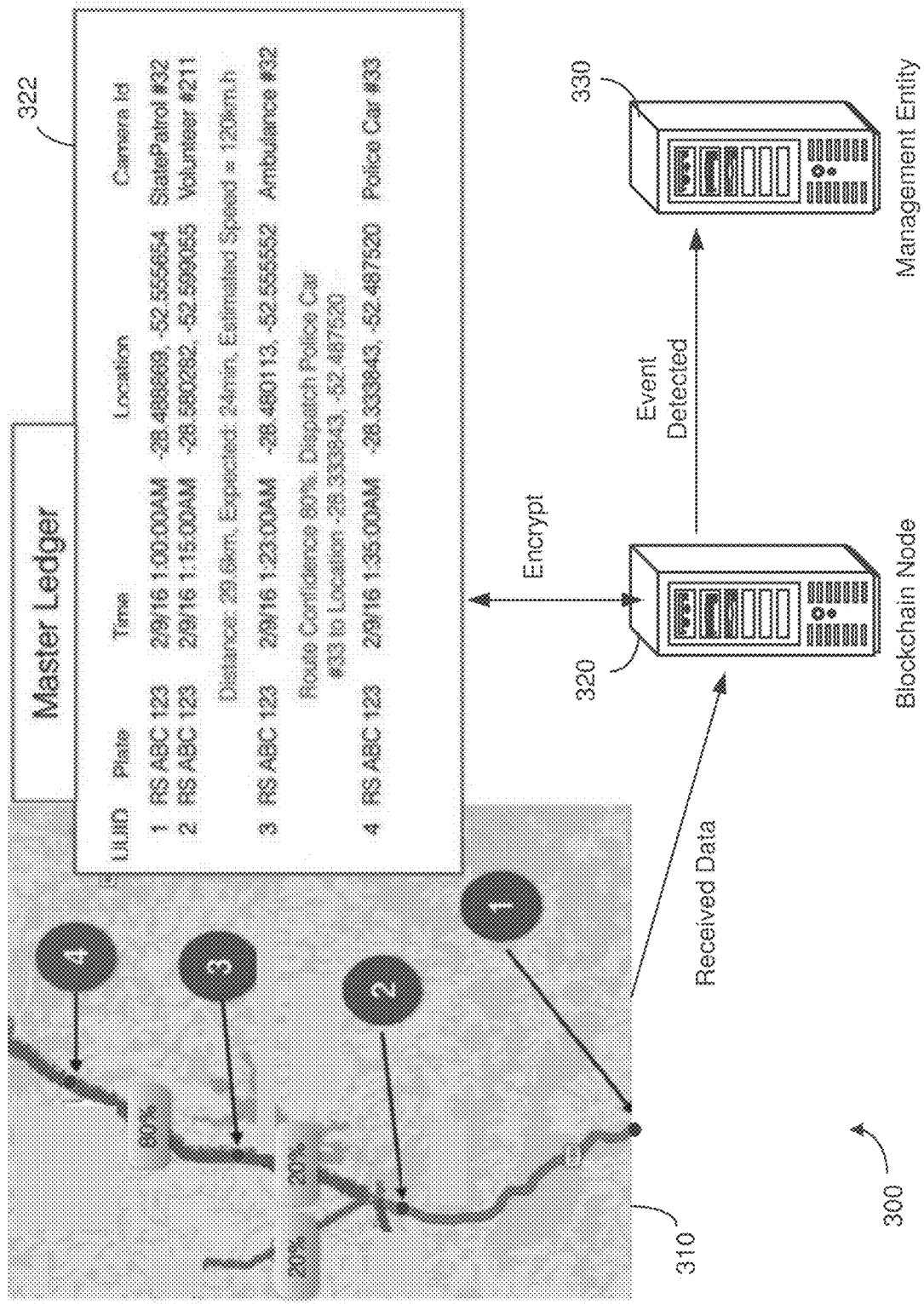
FIG. 3 is a diagram illustrating a process of a blockchain system performing a cognitive determination in accordance with an example embodiment.

FIG. 3 illustrates a process 300 of a blockchain system performing a cognitive determination in accordance with an example embodiment. In this example, IoT data is generated or otherwise captured by multiple different user devices and transmitted to a blockchain node 320. The blockchain node 320 may anonymize the received data for example, by assigning a unique and arbitrary user ID to each different device that sends data to the blockchain node 320 that only the blockchain system is aware of. As a result, the IoT data may be captured by concerned private citizens, organizations, places of business, an authority, or the like, and added anonymously to a blockchain ledger 322 that is managed by the blockchain node 320 and which may be replicated with other blockchain nodes (not shown) in the same network.

In the example of FIG. 3, data is captured of a vehicle at three different locations (i.e., locations 1, 2, and 3) as shown on map 310 by four different users. The data is transmitted to the blockchain node 320 directly, or via one or more intermediate devices such as an edge processing device, a cloud platform, and the like. The more data that is captured (e.g., by more users, more locations, etc.) the confidence that the event has occurred may be increased. In this example, the event is a vehicle travelling over the speed limit. The first scan location captures an initial location and time of the vehicle and the second scan location captures a subsequent location and time of the vehicle on a route.

Here, a smart contract executing on the blockchain node 320 may determine or receive an indication that the vehicle is travelling over the speed limit (e.g., 25 mph over the speed limit). In addition, based on various metadata associated with the captured IoT data the smart contract may determine a level of confidence that the event (i.e., traffic infraction) has occurred. The metadata used in the determination may be the user device/user that captured the image (e.g., authority vs. private citizen), a geographic location of the user device, a time stamp of the user device, a regular route travelled or static location of the user device, road entry/exit traffic patterns, interstate route analysis, and the like. Based on the metadata, in this example, the smart contract has a confidence of 20% that the traffic infraction occurred after the second scan. However, the third scan increases the level of confidence of the event occurring as determined by the smart contract from 20% to 80%. In this example, the confidence threshold may be 75% or some other arbitrary number. After the third scan, the confidence threshold is exceeded and the smart contract outputs a notice to a management entity system 330 which may be a server, a cloud platform, another blockchain, etc.

In addition, the cognitive smart contract may also predict where the vehicle will be at a point in time in the future (i.e., the fourth location) and send a notice/alert to an authority or a corporation to intercept the vehicle at the fourth location based on the metadata of the previous three data captures received as well as metadata associated with the data received, the traffic patterns, the entry/exit routes, and the like. Furthermore, if the smart contract has knowledge of where multiple intercept vehicles (e.g., authority/corporate) are located, the smart contract can select the vehicle that will be closest to the future location and provide instructions for time/location of the future point to the selected intercept vehicle.

Smart contract cognitive capabilities may be based on numerous factors. The factors may include one or more of a number of evidence collected (e.g., a number of devices that witnessed the offense and provided supporting data). As another example, a crowd factor may be set to determine the importance of each contributor. Factors for anonymous contributor may be lower than one reported by a known, trusted government vehicle. As another example, the quality of the evidence provided by a witness may be a factor such as a photo with GPS data may have a higher weight than a photo alone. As another example, distance correlation may be used to account for data clusters. That is, for a system that requires photo capture at location 1 and location 2 to determine speed, half of the evidence may be captured at location 1 and the other half of location 2. However, if all but one evidence is captured at location 1 and only 1 evidence at location two, a weaker confidence may be determined. Another factor that can affect the confidence level is trigger correlation. If two similarly located systems with stationary devices capture a same event, it might be considered common. However, if two vehicles that are unrelated capture the same event there is an increase level of confidence that the event has actually occurred because it is not common that two unrelated vehicles capture the same triggering event often. Therefore, there is a higher likelihood that the event occurred.

Figure 4A:
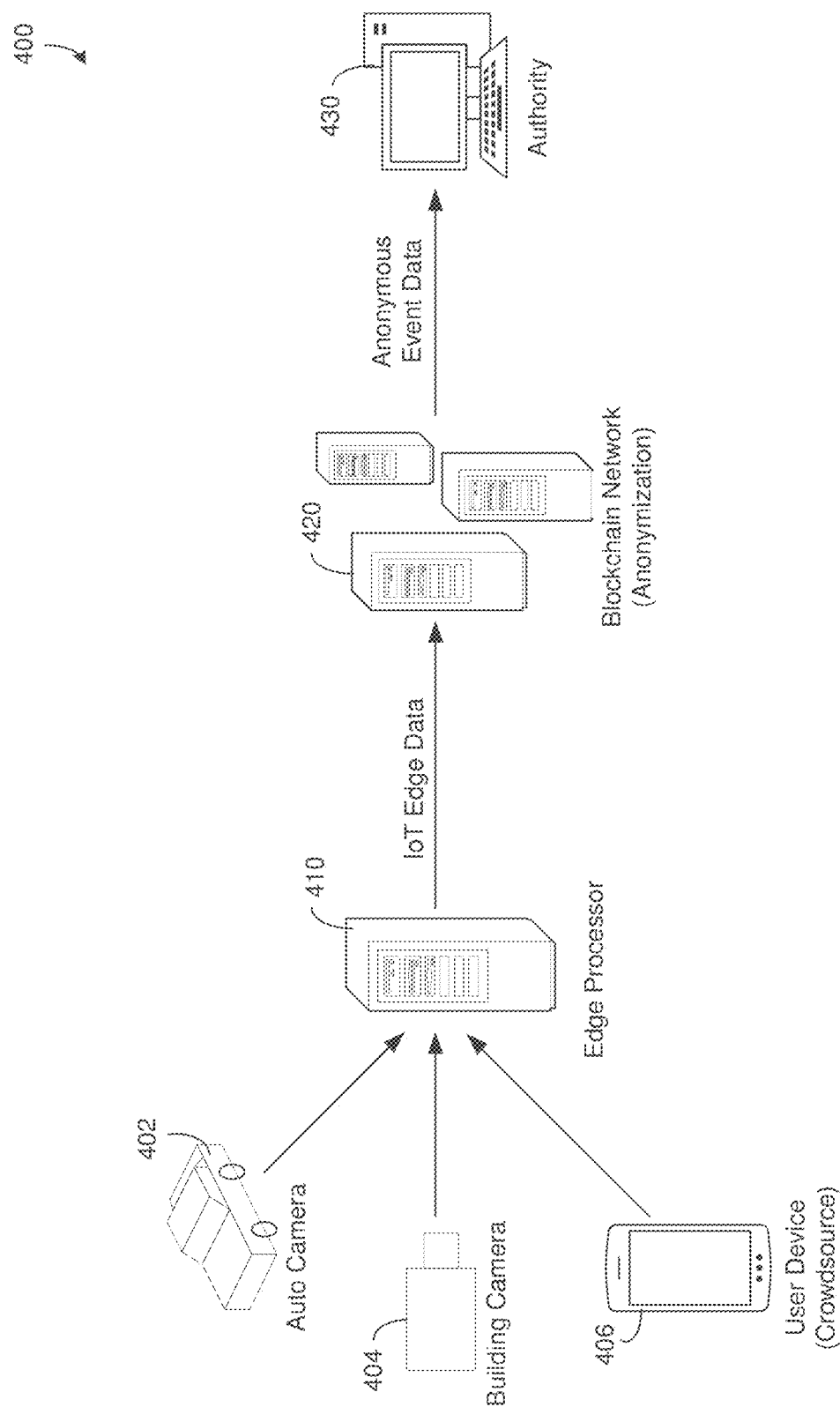
FIGS. 4A-4B are diagrams illustrating a blockchain anonymizing edge data from multiple different edge devices in accordance with example embodiments.
Figure 4B:
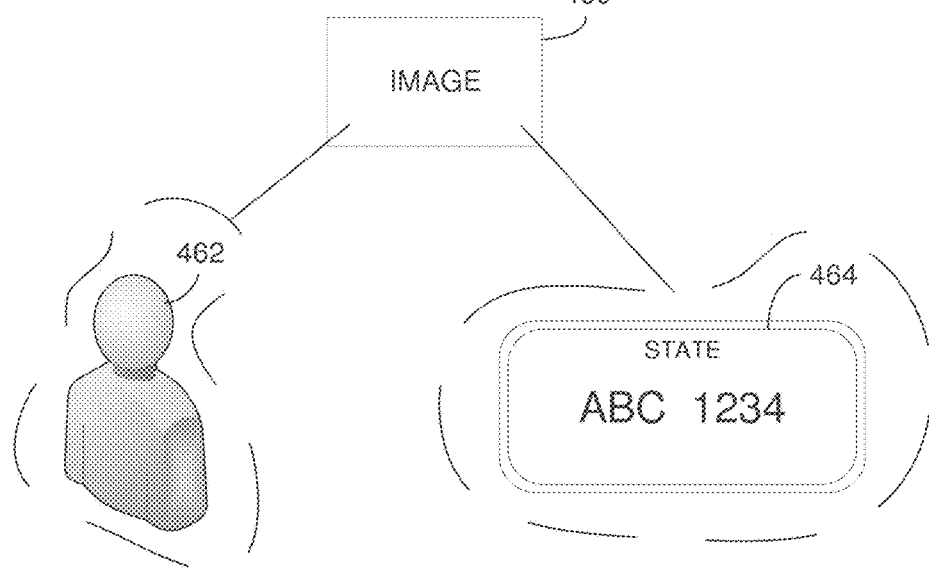

FIGS. 4A-4B illustrate examples 400A and 400B of a blockchain anonymizing edge data from multiple different edge devices in accordance with example embodiments. In particular, 400A of FIG. 4A illustrates various edge devices (402, 404, and 406) capturing publicly available data and submitting the captured data to a blockchain network 420. In some embodiments, the captured data may be processed by an edge processor 410 to attach metadata to the captured data. However, in some embodiments, the captured IoT edge data may be transmitted directly from the edge devices 402, 404, and 406 to the blockchain network 420. In the example of FIG. 4A, image data is captured by the edge devices 402, 404, and 406. However, it should be appreciated that other data may be captured such as temperature, pressure, emissions, audio, and the like. Also, different user devices may be accorded differing levels of trust. For example, an automobile camera 402 (from an authority vehicle) may be accorded more trust/confidence than a building camera 404 or a private citizen 406.

As IoT data is transmitted to the blockchain network 420, a blockchain node included within the blockchain network 420 may receive the IoT data and the smart contract executing therein may perform different anonymizations on the data. As shown in 400B of FIG. 4B, the blockchain node/smart contract may generate a table 450 that identifies an edge device using a unique transaction key that is assigned by the blockchain node/smart contract to each user device. The unique transaction key can be used by the edge device to sign captured IoT data each time the edge device transmits captured data to the blockchain network. When the data is received, an identity of the user device (e.g., IMEI, name, password, serial number, email, phone number, etc.) may be replaced with the unique transaction key assigned to the user device. Accordingly, the unique transaction key may be stored by the blockchain instead of the identity of the user device. The blockchain node may maintain an actual identity of the edge device (e.g., in an inaccessible storage) but keep the actual identity hidden from public view and from the authority/corporate view. The blockchain node may also maintain metadata of the captured data within the table such as an amount of data captured by each device, a geographical location of the device, a time at which the data was captured, a level of confidence associated with the device.

To further protect the rights/privacy of individuals in public environments, the blockchain network 420 may also obscure or otherwise anonymize information that is included within the captured IoT. For example, the smart contract executing on the blockchain node may remove an image from among a plurality of images when that image has personal information (e.g., faces, property, etc.) of innocent bystanders. Also, the smart contract may extract specific details from an image or a video rather than use an entire video/image content. For example, in FIG. 4B, the smart contract may extract an image of a user 462 and/or a license plate 464 from a larger image 460 which includes additional content that is to be protected and not provided to an authority.

In some embodiments, the blockchain network 420 may receive a request or some other query for event information from an authority system 430. In this example, the blockchain network 420 may reveal anonymous information of the event to the authority system 430 rather than reveal all of the captured information of the event. To provide the information to the authority system 430, the blockchain network 420 may decrypt the data and transmit the decrypted data to the authority system 430. As another example, the blockchain network 420 may store the encrypted data in a blockchain ledger accessible by the authority system 430 and provide the authority system 430 with a key for decrypting the stored data.

According to various aspects, the blockchain network 420 may decrypt and provide access to only enough information about the event to enable the authority 430 to understand that a crime or a violation has occurred such as a facial image of the perpetrator, a license plate, an object, a description of what has occurred, a victim statement/video, etc. However, other data such as innocent bystanders, witness/device ID, and the like, may be removed/anonymized from the data provided to the authority system 430. For example, the authority system 430 may receive images/details about a person or object involved in the commission of a crime or other violation, while images/details captured of other persons and objects not involved in the crime or other violation are obscured or hidden.

Figure 5:
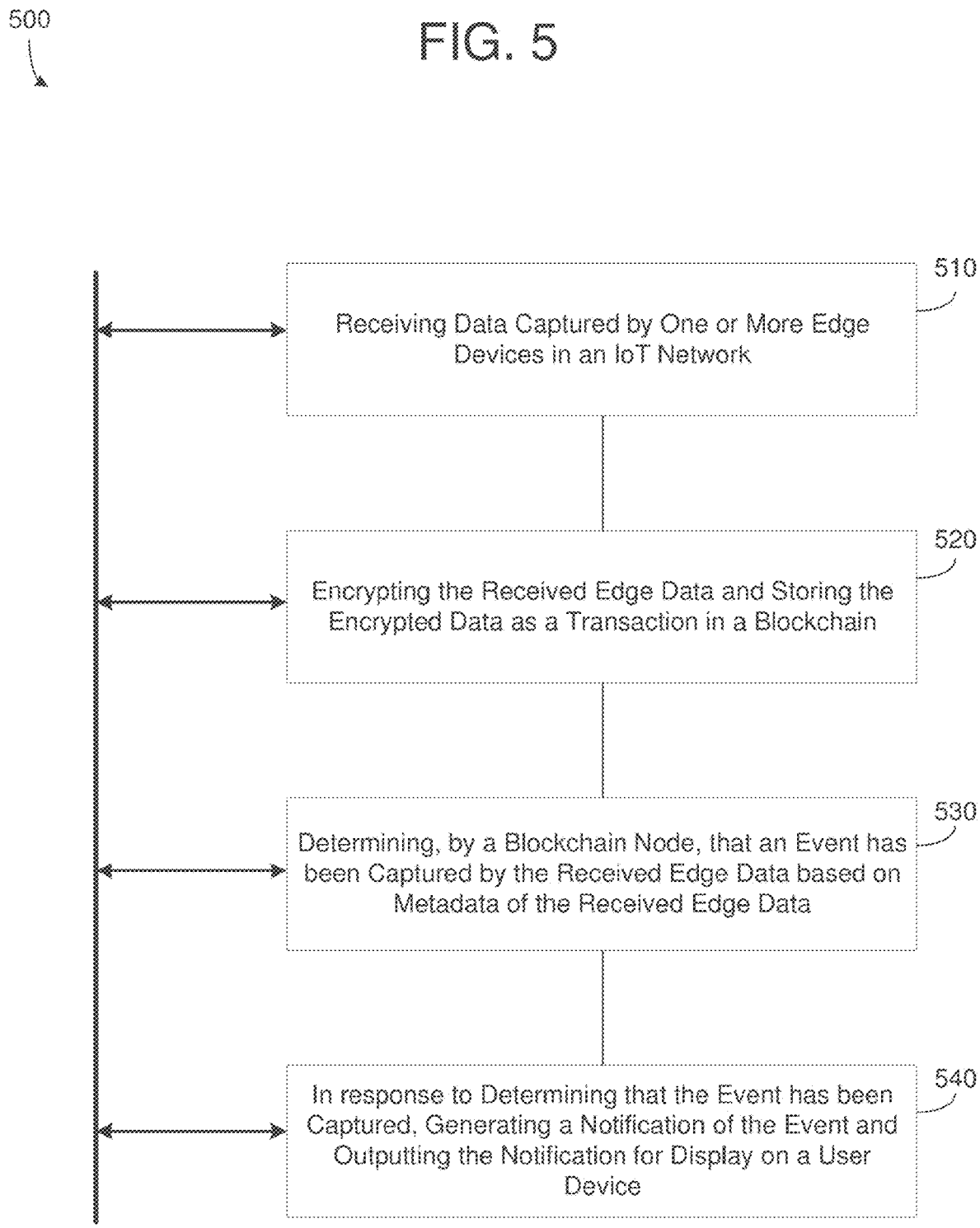
FIG. 5 is a diagram illustrating a method of a blockchain performing a cognitive determination in accordance with an example embodiment.

FIG. 5 illustrates a method 500 for performing a cognitive determination in accordance with an example embodiment. For example, the method 500 may be performed by a blockchain node which may include a computing device such as a server, a cloud platform, a workstation computer, a user device, and the like. In 510, the method includes receiving edge data that has been captured by one or more edge devices in an Internet of Things (IoT) network. For example, the edge data may be captured by a camera (e.g., authority, private citizen, building camera, etc.) which is connected to an IoT network. In 520, the method includes encrypting the received edge data and storing the encrypted edge data as one or more transactions within a blockchain.

In 530, the method includes determining, by a blockchain node, that an event has been captured by the received edge data based on metadata of the received edge data. The determination may be performed by a smart contract executing on the blockchain ode. As described herein, the event may include a person or an object committing or otherwise involved in one or more of a violation of law, an accident, or some other event. The captured edge data may include one or more images captured of a person performing the event and metadata associated with the one or more captured images. In this example, the metadata may include information related to the captured edge data which is used to enhance an amount of trust that is applied to the edge data. For example, the metadata associated with each image may include one or more of a geographical location at which the image was captured, a time at which the image was captured, and an identity of an edge device which captured the image. In some embodiments, the metadata may also or instead include an amount of edge devices that captured at least one image of the event. In this example, the determining that the event has been captured may include determining that the event has been captured in response to determining that an amount of edge devices that captured at least a portion of the event exceeds a predetermined confidence threshold.

In response to determining that the event has been captured, in 540 the method includes generating a notification associated with the event being captured and outputting the generated notification for display on a user device. The generating of the notification may further include decrypting encrypted blockchain data captured of the event and transmitting the decrypted blockchain data captured of the event along with the notification to the user device. As another example, the generating of the notification may further include generating a key for decrypting the encrypted blockchain data and transmitting the key along with the notification to the user device.

FIG. 6 illustrates a method 600 of a blockchain anonymizing edge data in accordance with an example embodiment. For example, the method 600 may be performed by a blockchain node which may include a computing device such as a server, a cloud platform, a workstation computer, a user device, and the like. In 610, the method includes storing encrypted Internet of Things (IoT) data as transactions in a blockchain. Here, the IoT data may be captured by one or more edge devices of an IoT network. In 620, the method further includes receiving an identification of an event, and in response, retrieving encrypted IoT transaction data stored in the blockchain which is associated with the event. For example, the event may include a violation of law, and the stored IoT data may include information such as images and other data captured of at least one of a person and an object while involved in the violation of law.

In 630, the method includes decrypting, via a blockchain node, the retrieved IoT transaction data associated with the event and generating anonymized data of the event from the decrypted IoT transaction data in which personally identifiable information is anonymized. Here, the decrypting and the generating may be performed by a smart contract executing on the blockchain. The retrieved IoT transaction data may include an image captured of the event being performed, and the generating the anonymized data may include removing personally identifiable information included in the image captured of the event being performed. Here, the removing may include removing personally identifiable information (i.e., identification data, facial images, property images, etc.) of one or more of a person and an object included in the image that is not involved in performing the event. In 640, the method includes outputting information concerning the anonymized data of the event to one or more of a user device and a display device.

For example, the retrieved IoT transaction data in 630 may include a plurality of images captured of the event, and the generating the anonymized data may include removing one or more images from among the plurality of images which include personally identifiable information. As another example, the stored IoT data may include an image captured by a crowdsourcing user device, and the generating the anonymized data may include removing personally identifiable information of the crowdsourcing user device that captured the image such as an IMEI, serial number, IP address, phone number, email, or the like, associated with the device. In some embodiments, the IoT data stored by the blockchain may be signed by an edge device using a unique transaction certificate that is known to the blockchain node but which is anonymous to other devices.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in computing node 700 is shown in the form of a general-purpose computing device. The components of computer system/server 702 may include, but are not limited to, one or more processors or processing units 704 (i.e., processors), a system memory 706, and a bus that couples various system components including system memory 706 to processor 704. The computing node 700 may be the blockchain node 130 shown in FIG. 1 or another device or combination of devices such as a server, cloud platform, database, and/or the like. Also, the computing node 700 may perform each of the method 500 shown in FIG. 5 and the method 600 shown in FIG. 6.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726 (also referred to as a network interface). As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the network interface 726 may receive edge data that has been captured by one or more edge devices in an Internet of Things (IoT) network. The processor 704 may encrypt the received edge data, and store the encrypted edge data as one or more transactions within a blockchain included in the memory 706. The processor 704 may also determine that an event has been captured by the received edge data based on metadata of the received edge data. For example, the processor 704 may execute a smart contract which performs the encrypting and the cognitive determination that an event has been captured. In response to determining that the event has been captured, the processor 704 may generate a notification associated with the event being captured, and control the network interface 726 to output the generated notification for display on a user device. Here, the user device may be connected to the computing node 700 via a network. In some embodiments, the notification may be output to the embedded display 722 (or externally connected display) of the computing node 704.

In some embodiments, the processor 704 may decrypt the encrypted blockchain data captured of the event and control the network interface 726 to transmit the decrypted blockchain data captured of the event along with the notification to the user device. As another example, the processor 704 may generate a key for decrypting the encrypted blockchain data and control the network interface 726 to transmit the key along with the notification to the user device.

According to various aspects, the captured edge data may include one or more images captured of a person performing the event and metadata associated with the one or more captured images. Meanwhile, the metadata may include information related to the captured edge data which is used to enhance an amount of trust that is applied to the edge data. For example, the metadata associated with each image may include one or more of a geographical location at which the image was captured, a time at which the image was captured, and an identity of an edge device which captured the image. In some embodiments, the metadata may include an amount of edge devices that captured at least one image of the event. In this example, the processor 704 may determine that the event has been captured in response to determining that an amount of edge devices that captured at least a portion of the event exceeds a predetermined confidence threshold.

As another example, the storage 706 may store encrypted IoT data as transactions in a blockchain. For example, the IoT data may be captured by one or more edge devices of an IoT network. The processor 704 may receive an identification of an event such as through a query or other request provided from an authority device or triggered based on the occurrence of a condition, and in response, the processor 704 may retrieve encrypted IoT transaction data stored in the blockchain which is associated with the event. Furthermore, the processor 704 may decrypt the retrieved IoT transaction data associated with the event, and generate anonymized data of the event from the decrypted IoT transaction data in which personally identifiable information is anonymized. The processor 704 may output information concerning the anonymized data of the event to one or more of a user device and a display device. In some examples, the event may include a violation of law, and the stored IoT data may include information captured of at least one of a person and an object while involved in the violation of law.

According to various aspects, the retrieved IoT transaction data may include an image captured of the event being performed, and the processor 704 may generate the anonymized data by removing personally identifiable information included in the image captured of the event being performed. Here, the processor 704 may execute a smart contract which anonymizes the data. For example, the processor 704 may remove personally identifiable information of one or more of a person and an object included in the image that is not involved in performing the event. As another example, the retrieved IoT transaction data may include a plurality of images captured of the event, and the processor 704 may generate the anonymized data by removing one or more images from among the plurality of images which include personally identifiable information.

In some embodiments, the stored IoT data may include an image captured by a crowdsourcing user device, and the processor 704 may generate the anonymized data by removing personally identifiable information of the crowdsourcing user device that captured the image. In this example, the processor 704 may remove the personally identifiable information of the crowdsourcing user device by removing one or more of device identification, a phone number, a username, an email address, and a name, associated with the crowdsourcing user device. To maintain trust in the anonymous data, the stored encrypted IoT transaction data may be signed by an edge device using a unique transaction certificate that is known to the blockchain node but which is anonymous to other devices.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A blockchain processing method comprising:
assigning, via a blockchain, a unique transaction key to one or more edge devices to sign captured encrypted Internet of Things (IoT) data to be sent to the blockchain, thereby enabling the blockchain to verify that the encrypted IoT data is received from a trusted source;
storing the encrypted IoT data as transactions in the blockchain, the IoT data being captured by the one or more edge devices of an IoT network;
receiving an identification of an event, and in response, retrieving encrypted IoT transaction data stored in the blockchain which is associated with the event;
decrypting, via a blockchain node, the retrieved IoT transaction data associated with the event and generating anonymized data of the event from the decrypted IoT transaction data in which personally identifiable information is anonymized; and
outputting information concerning the anonymized data of the event to one or more of a user device and a display device.

2. The blockchain processing method of claim 1, wherein the event comprises a violation of law, and the stored IoT data comprises information captured of at least one of a person and an object while involved in the violation of law.

3. The blockchain processing method of claim 1, wherein the retrieved IoT transaction data comprises an image captured of the event being performed, and the generating the anonymized data comprises removing personally identifiable information included in the image captured of the event being performed.

4. The blockchain processing method of claim 3, wherein the removing comprises removing personally identifiable information of one or more of a person and an object included in the image that is not involved in performing the event.

5. The blockchain processing method of claim 1, wherein the retrieved IoT transaction data comprises a plurality of images captured of the event, and the generating the anonymized data comprises removing one or more images from among the plurality of images which include personally identifiable information.

6. The blockchain processing method of claim 1, wherein the stored IoT data comprises an image captured by a crowdsourcing user device, and the generating the anonymized data comprises removing personally identifiable information of the crowdsourcing user device that captured the image.

7. The blockchain processing method of claim 6, wherein the removing the personally identifiable information of the crowdsourcing user device comprises removing one or more of device identification, a phone number, a username, an email address, and a name, associated with the crowdsourcing user device.

8. The blockchain processing method of claim 1, wherein the decrypting the retrieved IoT transaction data associated with the event and the generating the anonymized data of the event are performed by a smart contract executing on the blockchain node.

9. The blockchain processing method of claim 1, wherein the stored encrypted IoT transaction data is signed by an edge device using a unique transaction certificate that is known to the blockchain node but which is anonymous to other devices.

10. A blockchain computing system comprising:
a processor configured to:
assign, via a blockchain, a unique transaction key to one or more edge devices to sign captured encrypted Internet of Things (IoT) data to be sent to a blockchain, thereby enabling the blockchain to verify that the encrypted IoT data is received from a trusted source; and
a storage configured to:
store the encrypted IoT data as transactions in the blockchain, the IoT data being captured by the one or more edge devices of an IoT network, and
wherein the processor is further configured to:
receive an identification of an event, and in response, retrieve encrypted IoT transaction data stored in the blockchain which is associated with the event, decrypt the retrieved IoT transaction data associated with the event, and generate anonymized data of the event from the decrypted IoT transaction data in which personally identifiable information is anonymized, and
output information concerning the anonymized data of the event to one or more of a user device and a display device.

11. The blockchain computing system of claim 10, wherein the event comprises a violation of law, and the stored IoT data comprises information captured of at least one of a person and an object while involved in the violation of law.

12. The blockchain computing system of claim 10, wherein the retrieved IoT transaction data comprises an image captured of the event being performed, and the processor is configured to generate the anonymized data by removing personally identifiable information included in the image captured of the event being performed.

13. The blockchain computing system of claim 12, wherein the processor is further configured to:
remove personally identifiable information of one or more of a person and an object included in the image that is not involved in performing the event.

14. The blockchain computing system of claim 10, wherein the retrieved IoT transaction data comprises a plurality of images captured of the event, and the processor generates the anonymized data by removing one or more images from among the plurality of images which include personally identifiable information.

15. The blockchain computing system of claim 10, wherein the stored IoT data comprises an image captured by a crowdsourcing user device, and the processor is further configured to:
generate the anonymized data by removing personally identifiable information of the crowdsourcing user device that captured the image.

16. The blockchain computing system of claim 15, wherein the processor is further configured to:
remove the personally identifiable information of the crowdsourcing user device by removing one or more of device identification, a phone number, a username, an email address, and a name, associated with the crowdsourcing user device.

17. The blockchain computing system of claim 10, wherein the processor is further configured to:
   execute a smart contract that performs the decrypting of the retrieved IoT transaction data associated with the event and the generating the anonymized data of the event.

18. The blockchain computing system of claim 10, wherein the stored encrypted IoT transaction data is signed by an edge device using a unique transaction certificate that is known to the blockchain node but which is anonymous to other devices.

19. A non-transitory computer readable medium configured to store one or more instructions that when executed by a processor cause the processor to perform a method comprising:
   assigning, via a blockchain, a unique transaction key to one or more edge devices to sign captured encrypted Internet of Things (IoT) data to be sent to a blockchain, thereby enabling the blockchain to verify that the encrypted IoT data is received from a trusted source;
   storing the encrypted IoT data as transactions in the blockchain, the IoT data being captured by the one or more edge devices of an IoT network;
   receiving an identification of an event, and in response, retrieving encrypted IoT transaction data stored in the blockchain which is associated with the event;
   decrypting, via a blockchain node, the retrieved IoT transaction data associated with the event and generating anonymized data of the event from the decrypted IoT transaction data in which personally identifiable information is anonymized; and
   outputting information concerning the anonymized data of the event to one or more of a user device and a display device.

20. The non-transitory computer readable medium of claim 19, wherein the stored encrypted IoT transaction data is signed by an edge device using a unique transaction certificate that is known to the blockchain node but which is anonymous to other devices.

* * * * *